United States Patent [19]

Nakata et al.

[11] Patent Number: 5,734,535
[45] Date of Patent: Mar. 31, 1998

[54] MAGNETIC HEAD WITH A USEABLE LIFETIME DETECTION MECHANISM

[75] Inventors: Kazuhiko Nakata; Eiji Imai; Yoshihito Komatsu; Yukihiko Takita; Masashi Nakata, all of Nagano, Japan

[73] Assignee: Sankyo Seiki Mfg. Co., Ltd., Nagano-ken, Japan

[21] Appl. No.: 662,833

[22] Filed: Jun. 12, 1996

[30] Foreign Application Priority Data

Jun. 19, 1995 [JP] Japan ................... 7-151816
Mar. 13, 1996 [JP] Japan ................... 8-084740

[51] Int. Cl.⁶ ........................ G11B 5/187; G11B 5/455
[52] U.S. Cl. .................. 360/125; 360/120; 360/137; 324/262
[58] Field of Search ................ 360/113, 119–122, 360/125, 126, 128, 137; 324/262

[56] References Cited

U.S. PATENT DOCUMENTS

| | | | |
|---|---|---|---|
| 4,926,276 | 5/1990 | Orikasa et al. | 360/126 |
| 5,031,064 | 7/1991 | Ashikawa et al. | 360/122 |
| 5,202,806 | 4/1993 | Kawase | 360/120 |
| 5,291,364 | 3/1994 | Saito | 360/137 |
| 5,363,267 | 11/1994 | Fang | 360/128 |
| 5,495,371 | 2/1996 | Munemoto et al. | 360/137 |

FOREIGN PATENT DOCUMENTS

62-110706 7/1987 Japan.
6-111221 4/1994 Japan.

*Primary Examiner*—Jefferson Evans
*Attorney, Agent, or Firm*—McAulay Fisher Nissen Goldberg & Kiel, LLP

[57] ABSTRACT

A magnetic head having a head unit for contacting a magnetic medium comprises at least a pair of magnetic cores which are arranged in the head unit which face each other on sides of a magnetic gap for recording and/or reproducing signals. A spacer is included for maintaining a space between one of the magnetic cores and another member, which may be the other magnetic core or a shield member. The spacer includes a usable life detection device for providing an indication of wear on the head unit which is interrupted when the head unit is worn down to predetermined depth. A device for electrically sensing an interruption of the indication is provided so that a usable lifetime of the head unit can be determined.

20 Claims, 10 Drawing Sheets

MAGNETIC HEAD WITH A USEABLE LIFETIME DETECTION MECHANISM

BACKGROUND OF THE INVENTION a) Field of the Invention

This invention relates to a magnetic head of a magnetic recording/reproduction system which reads and/or writes signals on a magnetic medium. This invention particularly relates to a magnetic head which electrically detects the usable lifetime (wear-out limits) of the head unit of the magnetic head.

b) Description of the Related Art

Currently magnetic card readers which record/reproduce information written on a magnetic strip on a credit card, a cashing card, and a phone card, or information written on a magnetic strip on prepaid cards, and magnetic recording/reproduction systems such as a magnetic tape recorder which records/reproduces information on a magnetic tape, are popular.

Figure 10A:
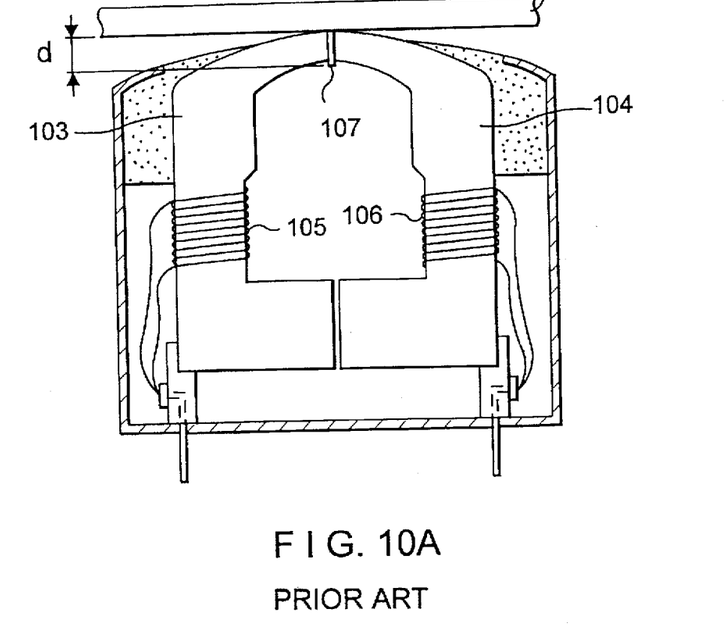
FIGS. 10(a) and 10(b) illustrate a configuration diagram of a magnetic head, which shows a prior art example.

FIG. 10(a) illustrates an example of a magnetic head which is used for a magnetic recording/reproduction system: the magnetic head is comprised of at least a pair of magnetic cores 103 and 104 which face each other on sides of a magnetic gap (a gap spacer) 107; for example, a reproduction coil 105 is wound around a magnetic core 103 while a recording coil 106 is wound around the other magnetic core 104; the magnetic head records and/or reproduces signals on a magnetic medium 2 which contacts the head unit and moves.

Figure 10B:
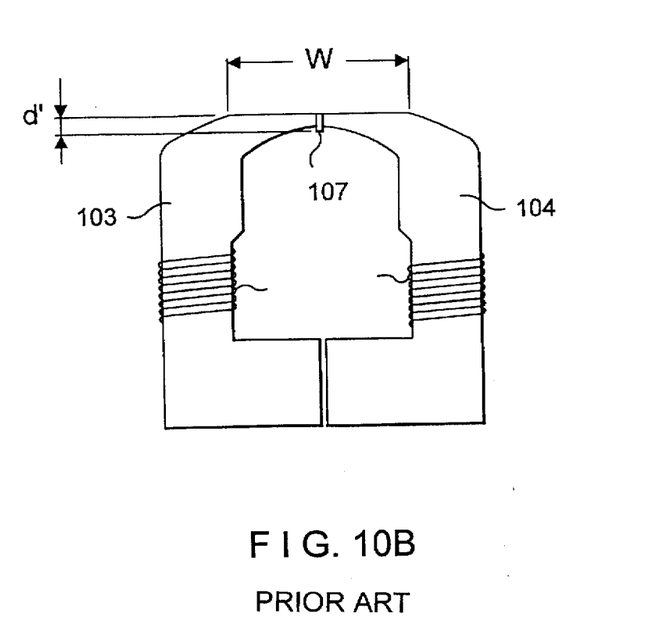

In a magnetic head with a structure as illustrated in FIG. 10(a), there is a section for magnetic recording/reproducing (hereafter "head unit"), in which a pair of magnetic cores 103 and 104 are positioned on both sides of a magnetic gap 107 and the head unit contacts a magnetic medium 2; however, both magnetic cores 103 and 104 at the magnetic gap 107 wear out over a period of use. When the initial depth d of the head unit is worn down and becomes thin, as illustrated in FIG. 10(b), beyond its wear-out limit point d, poor recording and/or reproduction occurs.

Since poor recording and reproduction suddenly occurs when the magnetic head reaches its wear-out limit point, it may destroy the information on a magnetic card such as a credit card or a cashing card when used in a magnetic recording/reproduction system such as a card reader; in some cases, the card may be refused, causing a great inconvenience for users. Therefore, it is necessary to predict the usable lifetime (wear-out limits) of the magnetic head before it reaches its usable lifetime, and to replace the worn-out magnetic head.

To solve this problem, Japanese utility model laid open SHO 62-110706 and Japanese patent laid open HEI 6-111221 disclose the related art to detect the usable lifetime of the magnetic head; however, these technologies are used for detecting the change in resistivity in a resistor which is arranged to detect the worn-out amount, and the value is easily affected by the deviation or difference in the property value that is unique to each resistor. Therefore, it is difficult for such technologies to precisely detect the wear-out limits of the head unit. In addition, a detection element, comprised of a resistor for detecting the worn out amount, is configured separately from the essential components of the magnetic head, causing a problem in that the size of the entire configuration of the magnetic head increases greatly.

OBJECT AND SUMMARY OF THE INVENTION

This invention intends to solve the above mentioned problems and to provide a magnetic head having a usable life detection means which electrically and precisely detects the wear-out limits of the head unit and also simplifies the circuit configuration.

In accordance with the invention, a magnetic head having a head unit for contacting a magnetic medium comprises at least a pair of magnetic cores which are arranged in the head unit which face each other on sides of a magnetic gap for recording and/or reproducing signals. A spacer is included for maintaining a space between one of the magnetic cores and another member, which may be the other magnetic core or a shield member. The spacer includes a usable life detection device for providing an indication of wear on the head unit which is interrupted when the head unit is worn down to a predetermined depth. A device for electrically sensing an interruption of the indication is provided so that a usable lifetime of the head unit can be determined.

BRIEF DESCRIPTION OF THE DRAWINGS

In the drawings:

FIGS. 1(a), 1(b), 1(c) and 1(d) illustrate a configuration diagram of a magnetic head as an example of this invention.

FIGS. 5(a) and 5(b) illustrate a configuration example of a magnetic head of this invention.

FIGS. 6(a)–6(f) illustrate a configuration diagram of a magnetic head which shows an example of this invention.

FIGS. 7(a) and 7(b) illustrate an example of this invention.

DESCRIPTION OF THE PREFERRED EMBODIMENTS

The invention will be described in detail based on illustrated examples below.

(EMBODIMENT EXAMPLE 1)

Figure 1A:
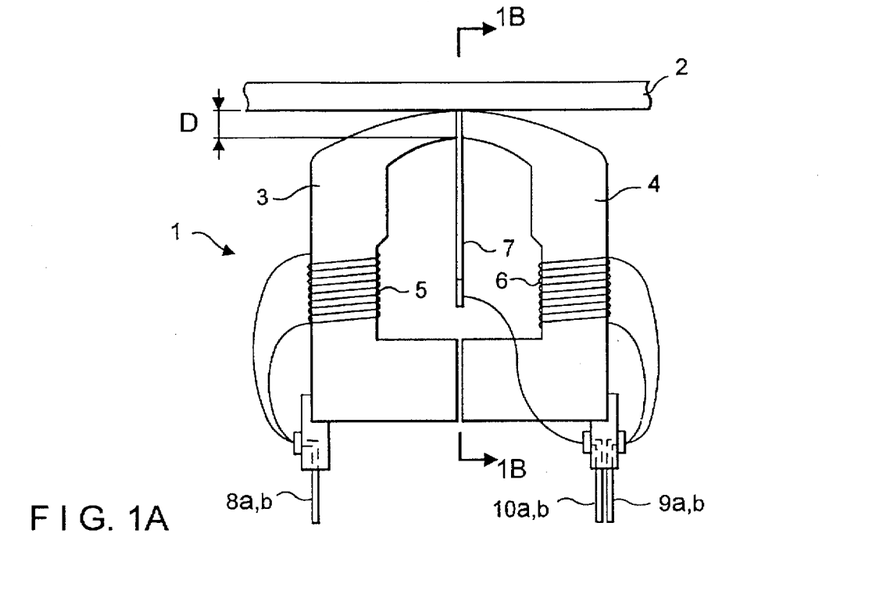
FIG. 1(a) is a cross section of the magnetic head in the direction orthogonal to a magnetic gap.
Figure 1B:
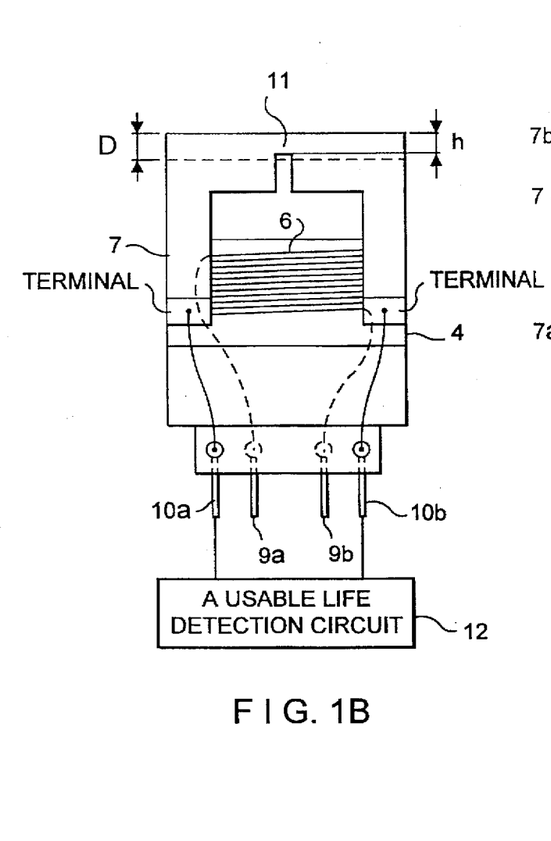
FIG. 1(b) illustrates an A—A cross section of the magnetic head illustrated in FIG. 1(a) and an example of a connection with a usable life detection circuit.
Figure 1C:
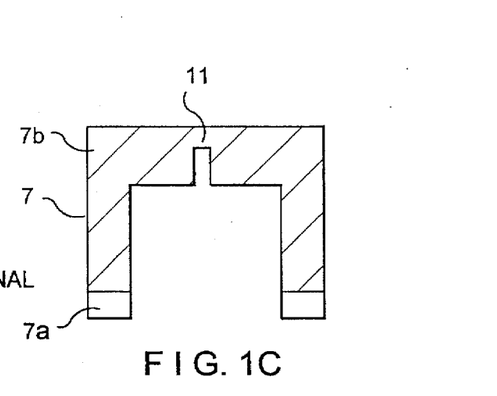
FIGS. 1(c) and 1(d) are respectively a plan view and a cross section of a gap spacer which is one of the features of this invention.
Figure 1D:
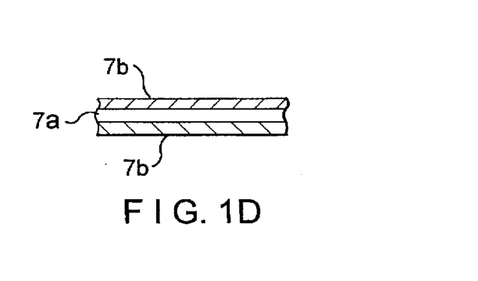

FIGS. 1(a)–1(d) represent a configuration diagram of a magnetic head illustrating an example of this invention: FIG. 1(a) illustrates a cross section of a magnetic head cut in the direction orthogonal to a magnetic gap; FIG. 1(b) illustrates an A—A cross section of the magnetic head of FIG. 1(a) and a connection example with a usable life detection circuit; FIG. 1(c) and FIG. 1(d) respectively illustrate a plan view and a cross sectional view of a gap spacer which is one of the features of this invention.

A magnetic head 1 illustrated in FIG. 1 is basically configured the same as the magnetic head illustrated in FIG. 10; the magnetic head contacts a magnetic medium 2 at a head unit comprised of at least one pair of magnetic cores 3 and 4 which face each other on the sides of a magnetic gap constructed with the gap spacer 7, to record and/or reproduce signals. A shield housing which covers the periphery of the magnetic core is not illustrated.

The magnetic cores 3 and 4 are made of a solid magnetic material such as permalloy, Sendust, or ferrite, or made of a layered thin metallic magnetic material and the like; the body of each magnetic core 3 and 4 is wound with coils 5 and 6 and each of them are connected to a reproduction circuit and a record circuit, which are not illustrated, via terminals 8a, 8b, 9a, and 9b. Coils 5 and 6 can be used for reproducing (reading) and recording (writing); when they are used for either reproducing or recording, it is appropriate to wind only one of the two cores. In this example, a gap spacer 7 which forms a magnetic gap between the pair of magnetic cores 3 and 4 is made of non-magnetic conductive material 7a (copper, phosphoric bronze, or the like) having an insulation layer 7b on both surfaces; in the gap spacer 7 a slit forms a usable life detection unit 11 (an electric path of a width h which is narrower than the usable depth D: the usable lifetime of the magnetic head which is disconnected or interrupted when the head unit is worn down to a position h shorter than a usable depth D (h<D), the distance between the contact surface of the magnetic gap and the magnetic medium 2. In addition, the magnetic head is configured so that both ends of the conductive material 7a of the gap spacer 7, in which the usable life detection unit is formed, are connected by wire to terminals 10a and 10b, and further connected therethrough to the usable life detection circuit 12 to electrically detect the disconnection of the usable life detection unit 11 and detect the usable lifetime (wear-out limits) of the head unit.

Any configuration can be applied to the usable life detection circuit 12 as long as the current path disconnection can be detected and it is easy to manufacture inexpensively. FIG. 4 illustrates a configuration example of a usable life detecting circuit.

Figure 4A:
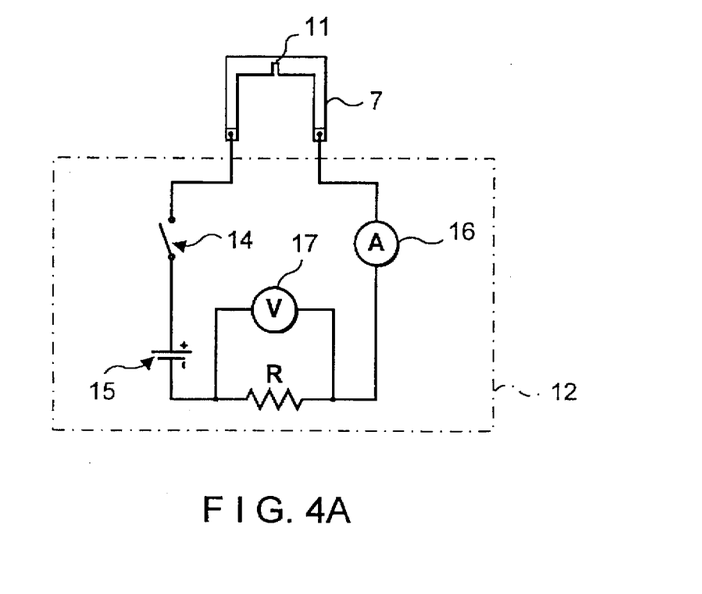
FIGS. 4(a) and 4(b) illustrate an example of this invention which shows a configuration example of a usable life detection circuit.

FIG. 4(a) illustrates an example wherein a usable life detecting circuit 12 comprised of switch 14, power source 15, ammeter 16 (or voltmeter 17), and current regulating resistor R is connected to a gap spacer 7. The switch 14 is interlocked (interacts) with a main switch for a magnetic recording/reproduction system. When the switch 14 is ON and the usable life detection unit (the slit unit) 11 of the gap spacer 7 is not worn-out, the ammeter 16 (or the voltmeter 17) displays a predetermined current value (or voltage value); when the usable life detection unit (the slit unit) 11 of the gap spacer is disconnected when the head unit is worn down, the current path is cut off and the ammeter 16 (or the voltmeter 17) displays the value of 0 to indicate the disconnected status of the current path due to the head unit's wearing down. Even before the usable life detection unit reaches disconnection, when the area of a cross section of the magnetic head is worn down to be smaller, its resistivity significantly increases compared to the initial current (or voltage) value. Consequently, one can easily predict that the magnetic head is reaching the end of its usable lifetime. Therefore, if the ammeter 16 (or the voltmeter 17) of FIG. 4(a) is located in a position where it catches one's eye easily during a periodical maintenance, coming to the usable lifetime (wear-out limits) of the magnetic head can be easily detected.

Figure 4B:
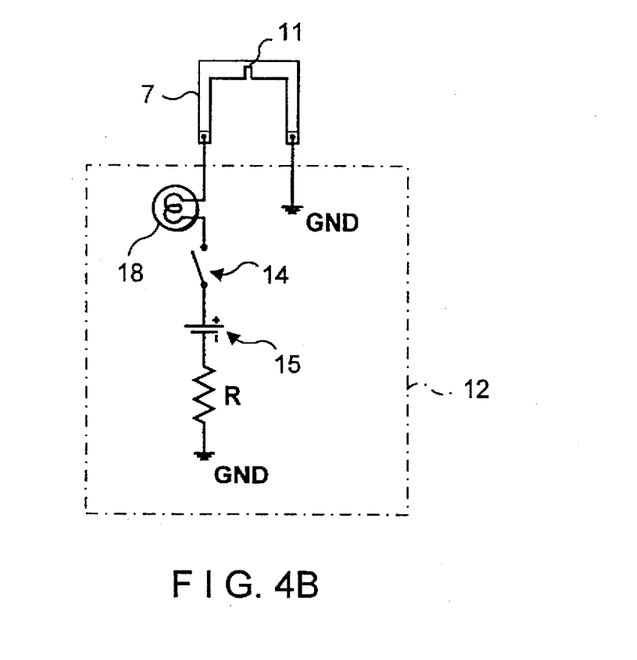

In addition, FIG. 4(b) illustrates a usable life detection circuit 12 having more simple configuration: one end of a gap spacer 7 is connected to a usable life detection circuit which is comprised of a pilot lamp 18 made of light-emitting diode (LED) and the like, a switch 14, a power source 15, and a current regulating resistor R; the other end of the gap spacer 7 is grounded via the shield housing or the like. The switch 14 is interlocked with a main switch for a magnetic recording/reproduction system; with the switch 14 ON, when a usable life detection unit (a slit section) 11 of the gap spacer 7 is not worn-out, the current flows in a current path, and the pilot lamp 18 turns on. However, when the usable life detection unit (the slit unit) of the gap spacer 7 is disconnected when the head unit is worn down, the current path is disconnected, and the pilot lamp 18 turns off. Therefore, if a pilot lamp 18 of a display means to indicate a disconnected status due to the wearing down, is placed in a position where it catches one's eye, such as a vicinity of the main switch, the usable lifetime (wear-out limits) of the magnetic head can be easily detected only by looking at an indicated status (ON/OFF) of the pilot lamp 18, without implementing a complex inspection.

The scope of this display means is not limited to a visual means such as a pilot lamp; it is preferable that an audio warning means such as a buzzer is used to warn one of the end of the usable lifetime of the magnetic head. Many other warning means are applicable to other examples of this invention as well, but further description is omitted.

As described above, a magnetic head of this invention is configured in that a slit-like usable life detection unit 11 which is disconnected when the head unit is worn down to any point at h which is shorter than a usable depth D (h<D), the distance between a contact surface of a magnetic medium 2 and a magnetic gap, is formed in a gap spacer 7; then the gap spacer 7 is connected to a usable life detection circuit 12; and a disconnection due to the wearing out of the usable life detection circuit 12 is detected via the usable life detection unit 11 and a usable lifetime (wear-out limits) of the head unit is measured. With such a configuration, one can be easily informed that the head unit has reached its usable lifetime (wear-out limits) and also predict an appropriate replacement timing for the magnetic head. This makes it easier to maintain a magnetic recording/reproduction system.

In particular, the gap spacer 7 of this invention is formed so that a gap spacer creates a magnetic gap between a pair of magnetic cores 3 and 4; it detects a usable depth itself of the magnetic head which detects a usable lifetime. This structure greatly improves properties of a usable life detection unit compared to a conventional unit formed on the side of a head unit. In addition, the configuration, in which a disconnection due to the wearing down of the usable life detection unit 11 is detected by a usable life detection circuit 12, detects the disconnection of a usable life detection unit stably and precisely, and consequently, it provides an easy configuration. In comparison, a conventional life detection unit detects the usable lifetime by means of changes in resistivity which deviates depending on the electrical properties of the resistor, thus provides poor control in precision.

The example illustrated in FIGS. 1(a)–1(d) demonstrate an example in which a usable life detection unit 11 is formed at a position in a gap spacer 7. However, if only one side of the magnetic head 1 contacts the magnetic medium 2, only the one side of the head unit will be worn-out. For this reason, an worn-out area of the head unit reaches its wear-out limits before the usable life detection unit 11 in the gap spacer 7 is disconnected.

Figure 2:
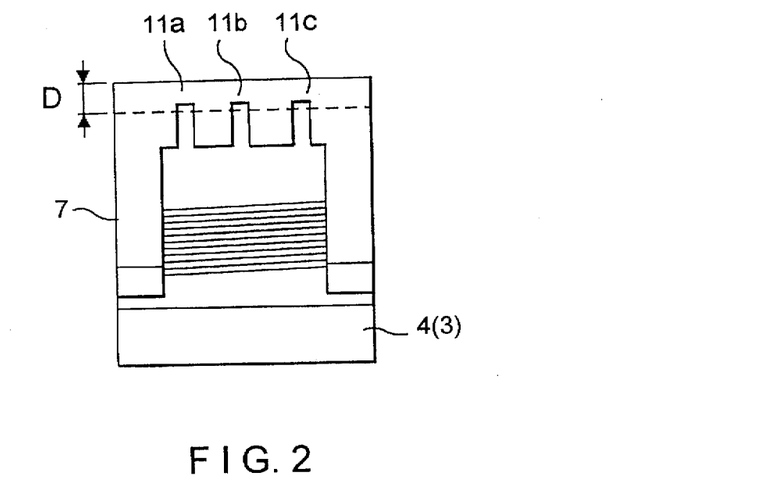
FIG. 2 illustrates an example of a gap spacer of this invention, in which usable life detecting areas are formed at a plurality of positions with respect to a magnetic gap direction of the magnetic head.

There is an example to solve this problem, as illustrated in FIG. 2, wherein usable life detection units 11a, 11b, 11c are formed at a plurality of appropriate positions on the gap spacer 7, preferably at the center and both ends in the gap width direction. With this configuration, even when only one side of the head unit is worn down, a usable life detection unit closest to the wear-out area is disconnected before the head unit reaches its wear-out limits. In this way, the usable lifetime (wear-out limits) of the head unit is detected for certain.

Figure 3:
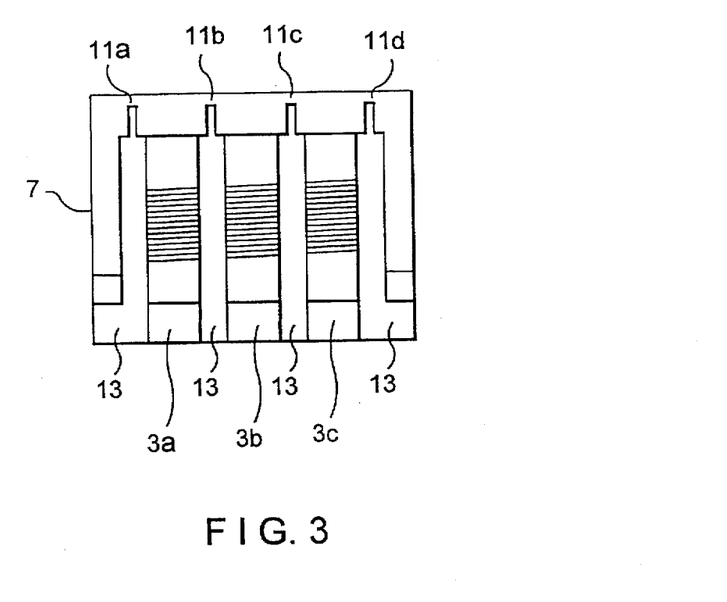
FIG. 3 illustrates another example of a gap spacer of this invention, in which usable life detection units are formed at a plurality of positions with respect to a magnetic gap direction of the magnetic head.

In a multi-channel type of magnetic recording/reproduction system, recording/reproduction is performed simultaneously with a plurality of tracks on the magnetic medium; a plurality of magnetic cores 3a, 3b, and 3c are arranged in parallel, via spacers 13, in the magnetic gap direction in the magnetic head, corresponding to a plurality of tracks on the magnetic medium. In this structure, as illustrated in FIG. 3, each of the magnetic cores 3a, 3b, and 3c (3-tracks example) corresponds to each of usable life detection units 11a–11d which are located at a plurality of positions in the gap spacer 7, for example, on both sides of each magnetic core, so that usable life detecting circuits sandwich magnetic cores. This configuration allows the sure detection of the usable lifetime (wear-out limits) of the head unit even when only one side of the head unit having a plurality of cores is worn down.

(EMBODIMENT EXAMPLE 2)

Figure 5A:
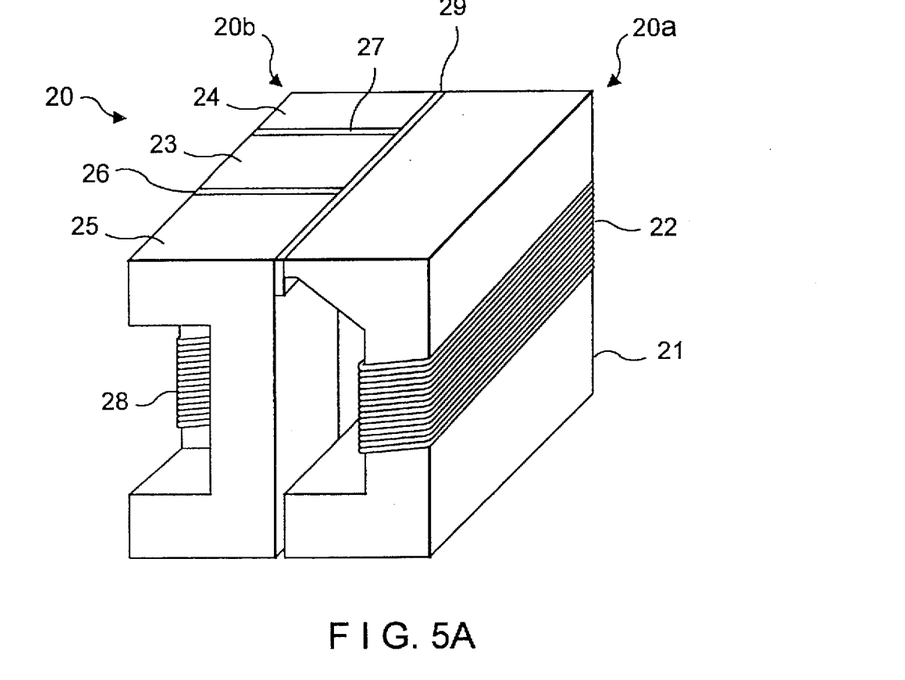
FIG. 5(a) is a perspective view of the magnetic head.
Figure 5B:
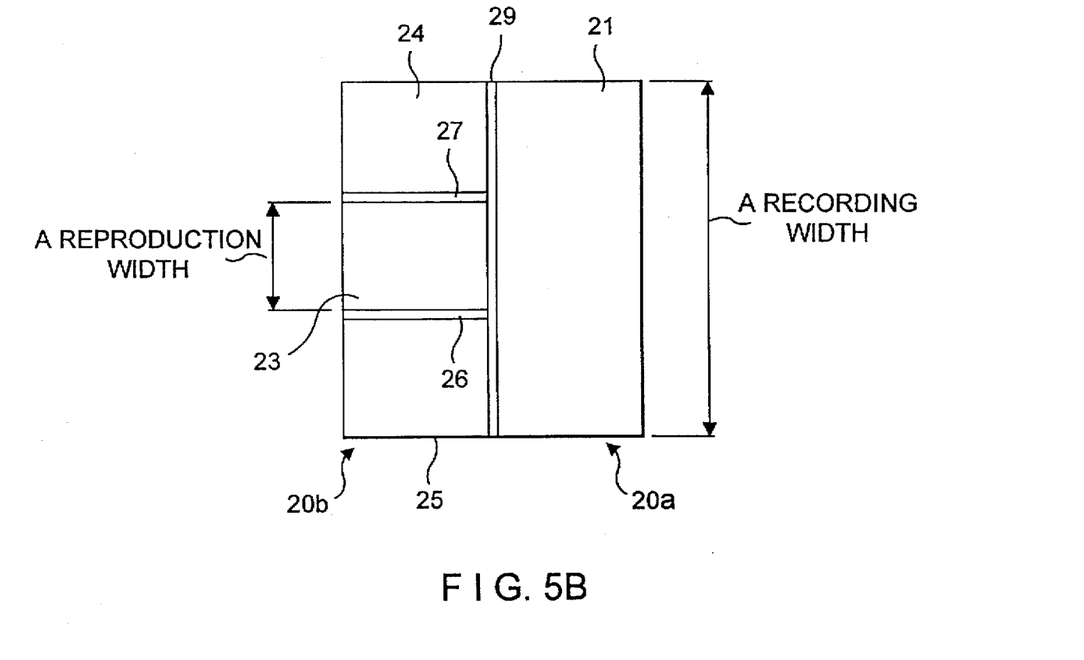
FIG. 5(b) is a plan view of the magnetic head of FIG. 5(a) when viewed from the top.

FIGS. 5(a) and 5(b) illustrate another example of a magnetic head to which this invention is applied: FIG. 5(a) is a perspective view of the magnetic head; FIG. 5(b) is a plan view of the magnetic head of FIG. 5(a) when viewed from the top. A magnetic head 20 comprises:

- a recording (writing) magnetic core 21 having a rectangular cross section with an opening and wound with a first coil 22;
- a reproduction (reading) core 23 having a rectangular cross section of a narrower width than that of the recording core 21 with an opening and wound with a second coil 28, which is positioned within a range of the aforementioned recording core width and is placed opposite the recording core 21 via a magnetic gap (gap spacer 29) to create a loop of magnetic path; and two side cores 24 and 25 which are positioned closely in parallel to both ends of the reproduction core via lamination spacers 26 and 27 and contact both sides of the recording core 21 via the magnetic gap (gap spacer 29). The recording core 21 side is constructed with a core 20a itself, and the reproduction core 23 side is constructed with a core 20b of a laminated structure. That is, this magnetic head 20 is a so-called "wide write/narrow read (W/N)" magnetic head which has a configuration of a wider recording core width than that of the reproduction core; wherein one side of the magnetic gap (gap spacer 29) is the core 20b having a laminated structure and comprises the reproduction core 23 of a narrow width and the side cores 24 and 25 laminated via the spacers 26 and 27 on both sides of the core 23, and the other core 20a is a recording core 21 having the same width of the sum of the reproduction core 20a and side core widths.

Each magnetic core may be made in any predetermined shape using a magnetic material such as permalloy, Sendust, or ferrite, or may be made by forming a plurality of layers to obtain a predetermined width using a thin magnetic metallic material.

The magnetic head illustrated in FIGS. 5(a) and 5(b) may be covered with a shield housing entirely except for the head unit which contacts the magnetic medium; this is not illustrated.

FIGS. 6(a)–6(e) represent a configuration diagram of a magnetic head for an example of this invention, which illustrates the configuration of the magnetic head illustrated in FIGS. 5(a) and 5(b) more clearly. The gap spacer 29 in FIGS. 5(a) and 5(b) can be configured as a spacer having a usable life detection unit, as already described configuration example 1; however, its example is omitted because of the repetition of the same description as Example 1.

Figure 6A:
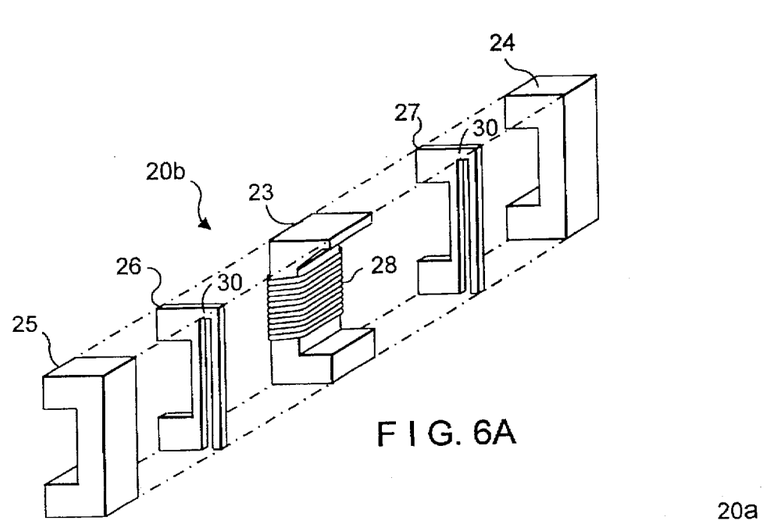
FIGS. 6(a) and 6(b) are perspective views to describe a component configuration and assembly process of the magnetic head illustrated in FIGS. 5(a) and 5(b)
Figure 6B:
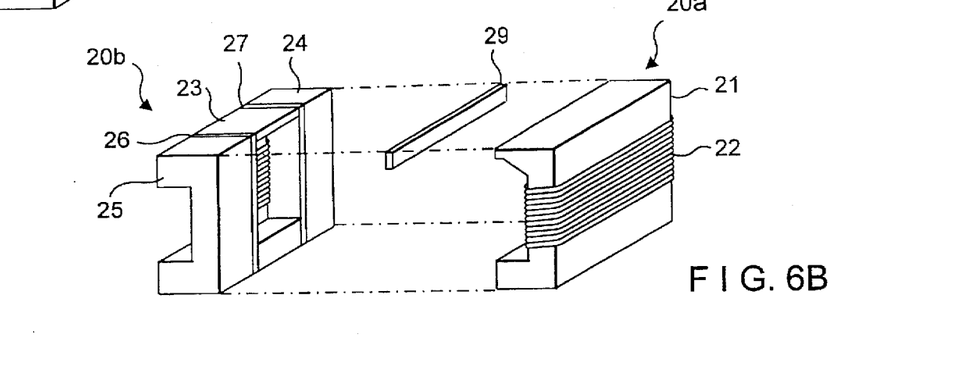

As illustrated in FIG. 6(a), in a core section 20b of a laminated structure, side cores 26 and 27 are laminated via lamination spacers 26 and 27, on both sides of a reproduction core 23 wound with coil 28; by fixing the core section 20b of laminated structure in the opposite of a recording core 22 via a gap spacer 29, as illustrated FIG. 6(b), a magnetic head illustrated in FIG. 5 is built.

Figure 6C:
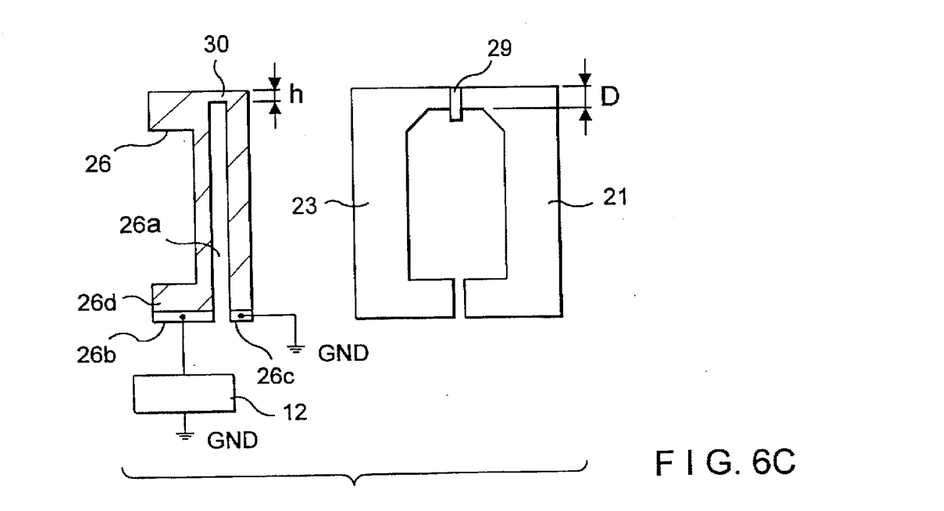
FIG. 6(c) is a configuration diagram of a lamination spacer on which a usable life detection unit is formed.

In this invention, among the lamination spacers 26 and 27 which are arranged between the reproduction core 23 and side cores 24 and 25 at a distance between cores, at least one lamination spacer (e.g. the spacer 26) is made of a conductive material (non-magnetic conductive material such as phosphorus bronze) having an insulation layer 26d on both surfaces (the area covered with oblique lines in the figure), as illustrated in FIG. 6(c); on the lamination spacer 26 formed is a usable life detection unit 30. The usable life detection unit 30 is configured in that a slit 26a is created at the center of the conductive material 26b of the lamination spacer 26 so that the width h of the contact point with the magnetic medium is shallower than the usable depth D of the magnetic gap of the magnetic head; and the current path is disconnected when the head unit is worn down to a position shorter than the usable depth D, the distance between the contact surface of the magnetic medium and the magnetic gap 29. Then, the lower ends of the lamination spacer 26 where the conductive material is exposed are used to be terminals 26b and 26c which are connected to the same usable life detecting circuit 12 as described in Example 1. The usable life detection circuit 12 detects disconnection of the usable life detection unit 30 (disconnection of the current path) due to the wearing-out to know the usable lifetime (wear-out limits) of the head unit.

When a slit 26a exists on the conductive material 26b of the lamination spacer 26, the physical strength of the spacer is lost; however, coating the insulation layer 26d over or attaching an insulator member to the entire surface of the conductive material 26b except the terminals 26b and 26c and filling the slit unit with the insulation material will reinforce its physical strength. Since the insulation layer 26d is coated on both sides of the lamination spacer 26, it is possible, even though the magnetic core is made of metallic magnetic material, to prevent the magnetic core and the conductive material of the lamination spacer from shorting.

In an example illustrated in FIG. 6(a), the lamination spacers 26 and 27 are formed in the same shape as the side cores 24 and 25, and a usable life detection unit is formed in each of the lamination spacers 26 and 27 on both sides of a reproduction core 23. Consequently, even when one side of the magnetic head contacts the magnetic medium and only the side is worn down, either one of the usable life detection units can detect the worn-out status of the head unit. Also, a plurality of slits of the same shape as illustrated in FIG. 2 are created in the lamination spacer, so that a usable life detection unit 30 can be arranged at a plurality of positions in the direction orthogonal to the magnetic gap (the driving direction of the magnetic medium). With a plurality of usable life detection unit formed also in the driving direction of the magnetic medium, the head unit's worn-out status can be detected even when the magnetic head and the magnetic medium makes uneven contacts with each other with respect to the driving direction.

Figures 6D, 6E, 6F:
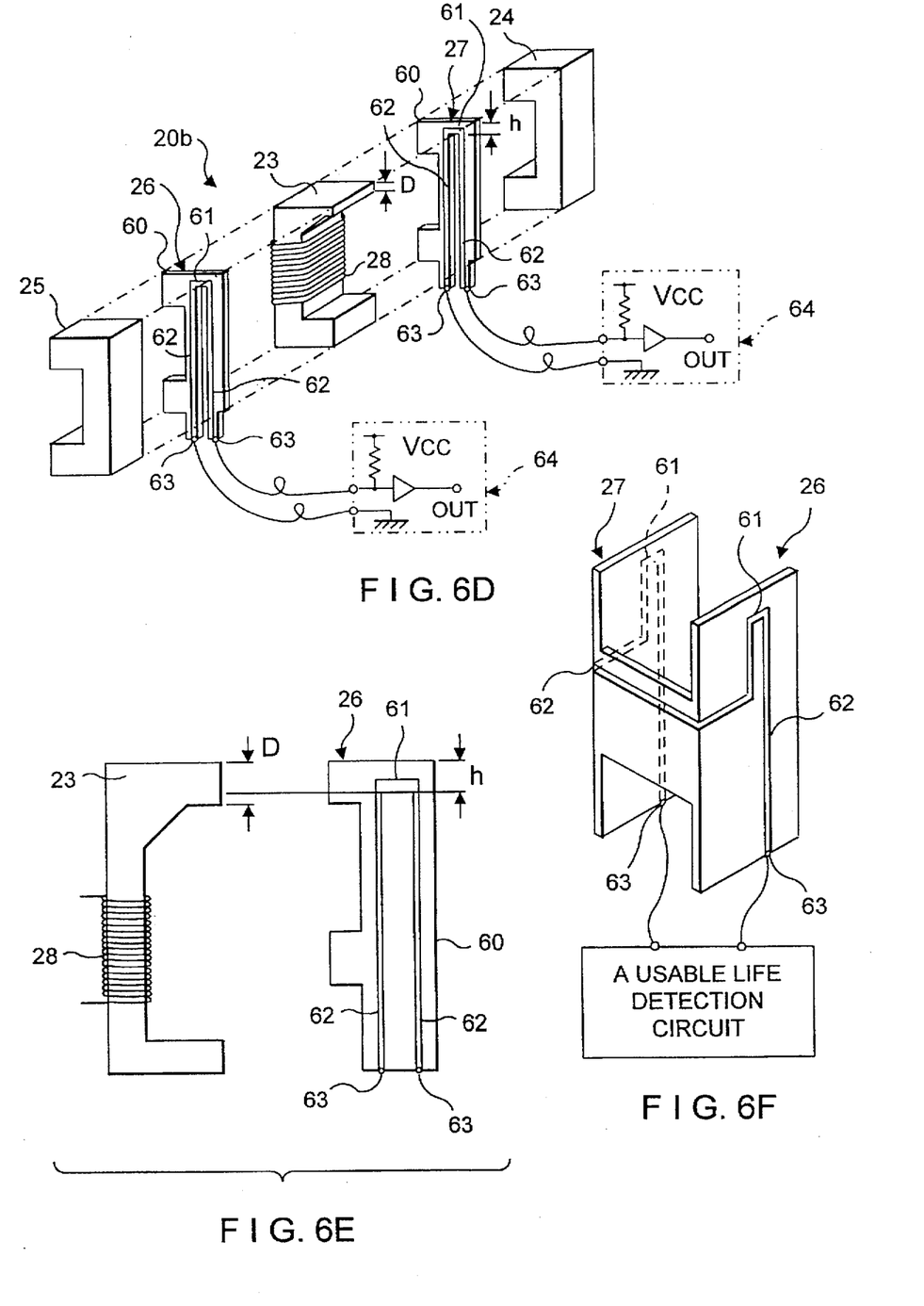
FIG. 6(d) is a perspective view that illustrates a component configuration of a magnetic head of a different example from FIG. 6(a)
FIG. 6(e) is a configuration diagram of a lamination spacer having a different usable life detection unit from FIG. 6(c)
FIG. 6(f) is another perspective view of this embodiment.

Next, FIG. 6(d) illustrates another example of a lamination spacer which is different from the one illustrated in FIG. 6(a), wherein lamination spacers 26 and 27 are composed of flexible circuit boards. Each of the lamination spacers 26 and 27 of this example is constituted of a flexible circuit board 60 made of flexible insulation material having a copper foil circuit pattern inside the board. The circuit pattern, of the above mentioned flexible circuit board 60 is configured, as illustrated in FIG. 6(e), in that an interconnect 61 to be a usable life detection unit is formed within the usable depth D in the surface of the gap unit side to form a depth h; and connected patterns 62 are formed on both ends of the interconnect 61; these are sandwiched to constitute a flexible circuit board 60. Terminals 63 are formed at the ends of the connected pattern 62; and a switching circuit 64 to be a usable life detecting circuit is connected to the aforementioned terminals 63. OUT, the output side of the switching circuit 64 is connected to an alarm system, communication wire, or the like, which is not illustrated. The circuit board 60 may be connected to the switching circuit 64 via lead wires from the terminals 63 at the ends of the circuit pattern, or can be directly connected to the switching circuit 64 by means of extending the circuit board 60, taking advantage of the flexibility of the board.

In the above configuration, when the gap unit of the magnetic head is worn out due to the contacts with the magnetic card, and the interconnect 61 of the flexible circuit board, which is a lamination spacer, is cut off, the potential that is grounded via the flexible circuit board 60 encounters the "High" status, which can be detected via the switching circuit 64.

The lamination spacer using a flexible circuit board of this example can be used as a gap spacer of the magnetic head illustrated in FIGS. 1(a)–1(d), or a side spacer of a magnetic head illustrated in FIG. 9, which will be described later.

Lamination spacers 26 and 27 are composed of different components as in FIG. 6(d), but they may be composed of a piece of flexible circuit board as illustrated in FIG. 6(f).

In the circuit configuration, as illustrated in FIG. 6(f), interconnects 61 to be usable life detection units are formed in the lamination spacers 26 and 27 and are connected in series; connected patterns 62 and terminals 63 are formed on both ends of the interconnects 61; usable life detection circuits are connected to the terminal 63.

If the flexible circuit board 60 is fixed by adhesive on each of the lamination spacers 26 and 27 on both sides of a reproduction core 23, a configuration is effected so that the process where the flexible circuit 60 is sandwiched between the reproduction core 23 and the lamination spacers 26, 27 is avoided.

Figure 7A:
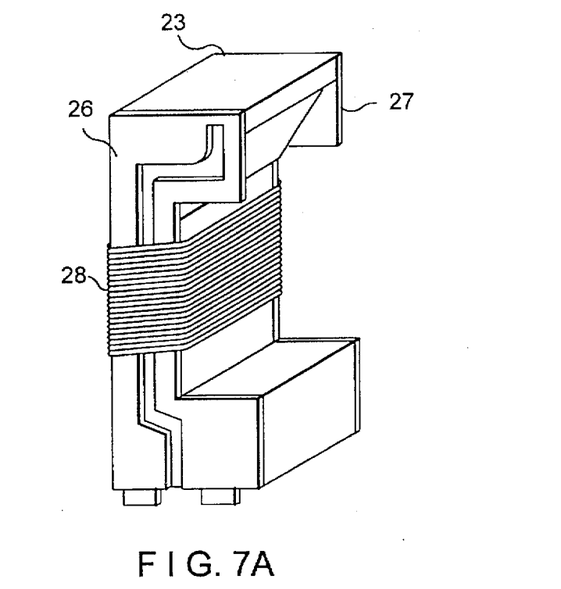
FIG. 7(a) is a perspective view of the example in which a lamination spacer with a usable life detection unit is formed integral with a reproduction core.
Figure 7B:
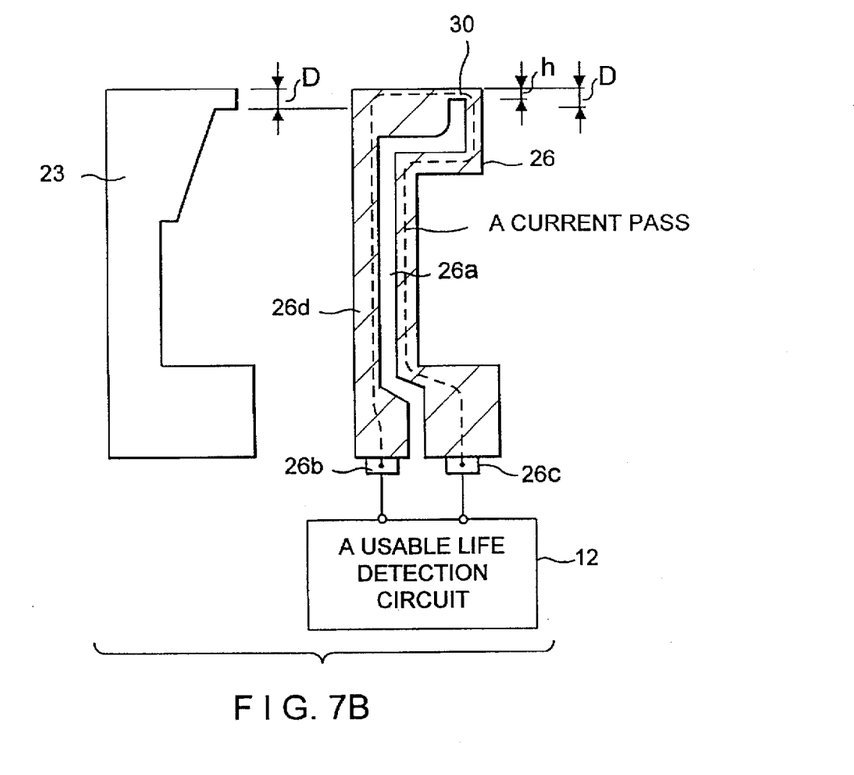
FIG. 7(b) is a configuration diagram of the lamination spacer illustrated in FIG. 7(a)

Next, FIG. 7(a) illustrates another configuration example of a lamination spacer of this invention. The lamination spacers 26 and 27 are shaped to fit the reproduction core 23, laminated on both sides of the reproduction core 23, and wound with a wire 28 integral with the reproduction core 23. As in the example of FIG. 6, the lamination spacer 26 is formed of a conductive material 26b having an insulation layer (the area covered with oblique lines) 26d on both surfaces as illustrated in FIG. 7(b), and a usable life detection unit 30 is formed in the lamination spacer 26. The usable life detection unit 30 is configured so that a slit 26a is created at the center of the conductive material 26b of the lamination spacer 26 and the width h that contacts the magnetic medium is shorter than the usable depth D of the magnetic gap 29 of the magnetic head; wherein the current path indicated with broken lines is disconnected when the head unit is worn down to a point shorter than the usable depth D, the distance between the magnetic medium contact surface and the magnetic gap.

In other words, in this invention, terminals 26b and 26c, downwardly exposing part of the conductive material of the lamination spacer 26, are connected to the same usable life detection circuit 12 of Example 1. By reading the disconnection of the usable life detection unit 30 (disconnection of the current path) due to the head unit's wearing down via the circuit 12, the lifetime (wear-out limits) of the head unit is detected.

Figure 8A:
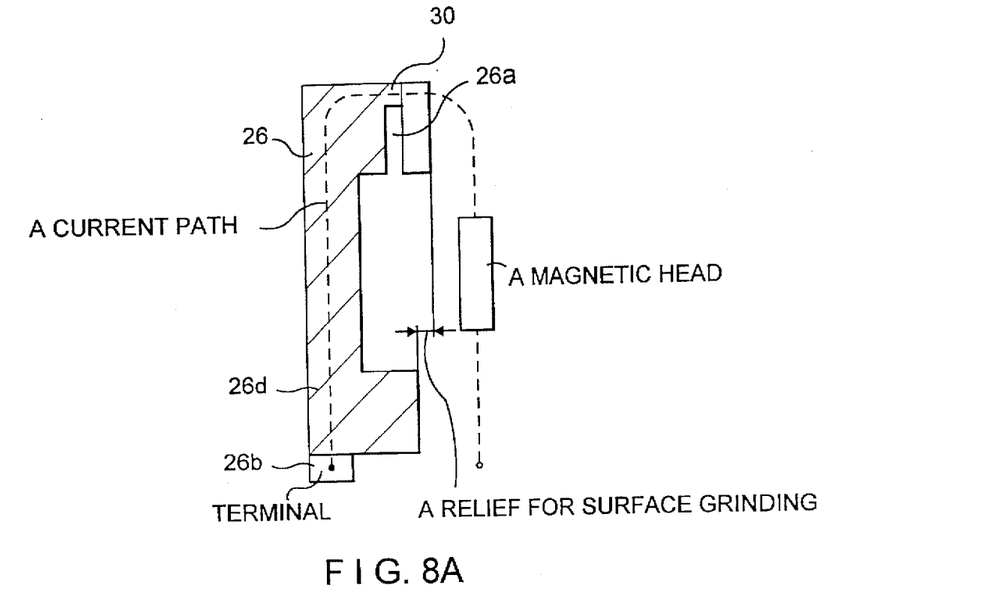
FIGS. 8(a)–8(c) illustrate an example of this invention, in which another configuration example and its current path in the lamination spacer with a usable life detection unit is illustrated.
Figure 8B:
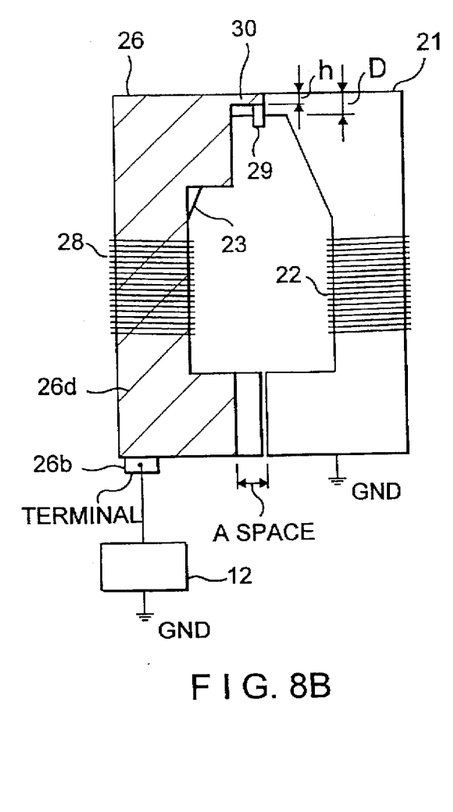
Figure 8C:
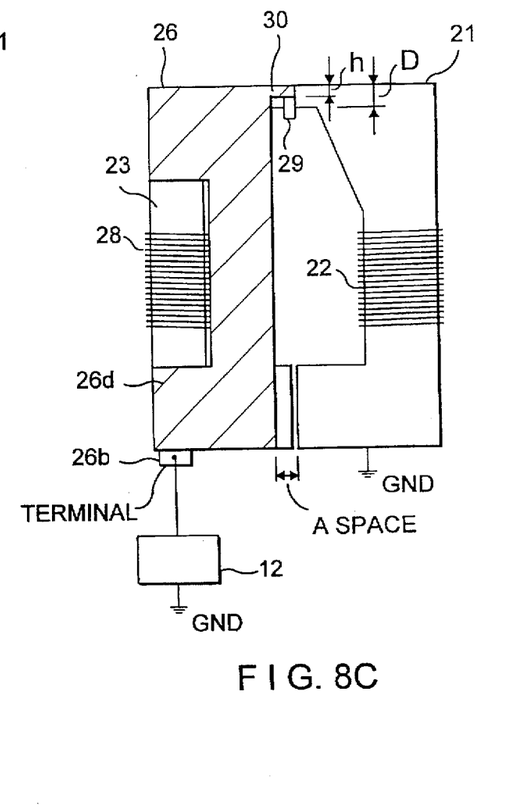

Next, FIGS. 8(a), 8(b) and 8(c) illustrate another configuration example for a lamination spacer of this invention. In the examples illustrated in FIGS. 6(a)–6(f) and FIGS. 7(a) and 7(b), the current path is configured only with the conductive material 26b used for the lamination spacer. However, in the example of FIGS. 8(a), 8(b) and 8(c), a metallic magnetic material is used for a magnetic core; one side of the current path for the usable life detection unit 30 is configured with the conductive material 26b for the lamination spacer; the other side of the current path takes advantage of the magnetic core in the head body. In other words, on each side of the usable life detection unit 30 formed is a terminal where conductive material is exposed: one of the exposed areas is connected to a usable life detection circuit and the other exposed area is arranged to contact the magnetic core made of metallic magnetic material, to configure the current path for the usable life detection circuit via the magnetic core.

Specifically, FIG. 8(a) illustrates an example in which the lamination spacer 26 is shaped to fit the reproduction core and a slit is added to form a usable life detection unit 30; an insulation layer (oblique lines in the figure) 26d is coated on the spacer 26 excluding the exposed area, which is on the magnetic gap side with respect to the usable life detection unit 30. By forming an exposed area on the magnetic gap side with respect to the usable life detection unit 30, which is not coated with an insulation layer, the spacer contacts the reproduction core at the area where the conductive material 26b is exposed on the magnetic gap side with respect to the usable life detection unit 30, and the spacer 26 is electrically connected when laminated closely on the reproduction core. In this way, the current path is formed to reach the reproduction core from the lamination spacer 26 via the usable life detection unit 30. Therefore, when the reproduction core side is grounded, only one terminal is required on the lamination spacer side; when a usable life detection circuit is connected between the terminal and the grounding cable, it is possible to detect the lifetime of the head unit as in the example of FIGS. 6(a)–6(f) or FIGS. 7(a) and 7(b).

FIGS. 8(b) and (c) illustrate an example regarding a usable life detection unit 30 for a lamination spacer, wherein the area which contacts the recording core 21 is given a width h shorter than the usable depth D of a magnetic gap; the bottom of the narrow (width) area is exposed and contacts the recording core 21, using the recording core 21 as a part of the current path for detecting a usable lifetime. When the recording core 21 side is grounded, only one terminal on the lamination spacer 26 side is required; when a usable life detection circuit 12 is connected between the mentioned terminal and the grounding cable, it is possible to detect a usable lifetime of the head unit 11 as in the example of FIGS. 6(a)–6(f) or FIGS. 7(a) and 7(b).

FIG. 8(b) illustrates an example in which a lamination spacer 26 is shaped to fit the reproduction core 23 and is wound with the wire 28 integral with the reproduction core; FIG. 8(c) illustrates an example in which the lamination spacer 26 is shaped to fit a side core. In either case, both surfaces of the lamination spacer 26 are coated with an insulation layer to prevent the reproduction core or the side core from shorting. In addition, to protect the spacer from contacting the recording core 21 at any position but the tip of the usable life detection unit 30 of the lamination spacer 26, a small space is provided between the lamination spacer 26 and the recording core 21.

(EMBODIMENT EXAMPLE 3)

Figure 9A:
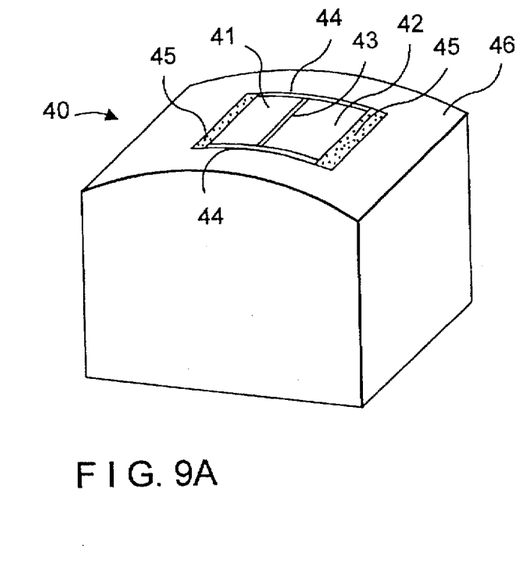
FIGS. 9(a)–9(d) illustrate an example of this invention, which shows a configuration of a magnetic head having a side spacer which has a usable life detection unit, and the side spacer.
Figure 9B:
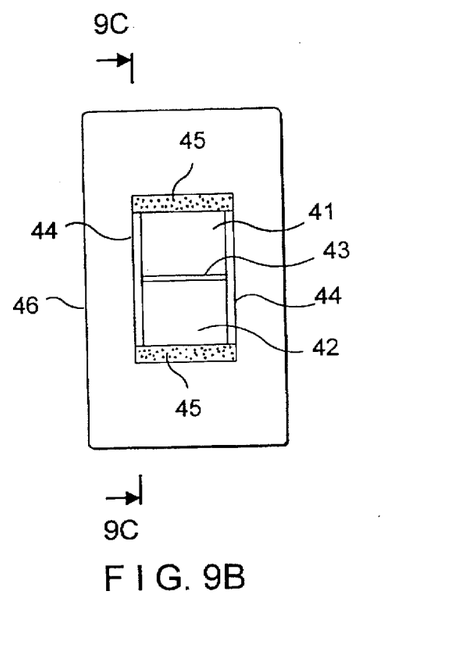
Figure 9C:
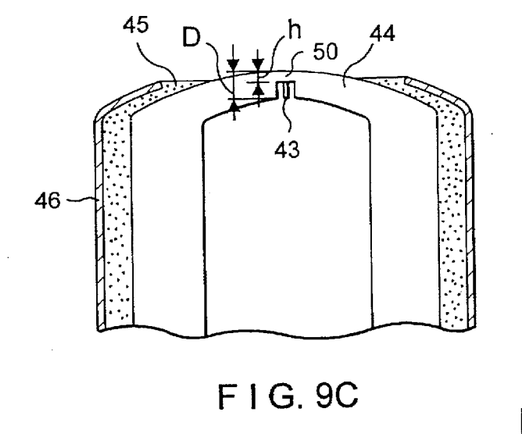

FIGS. 9(a)–9(d) illustrate another configuration example of a magnetic head of this invention: (a) is a perspective view of the magnetic head; FIG. 9(b) is a plan view of the magnetic head of FIG. 9(a) when viewed from the top; FIG. 9(c) is a B—B cross-section of a major section of FIG. 9(b).

The cross structure of a magnetic head 40 illustrated in FIGS. 9(a)–9(d) is the same as the one illustrated in FIG. 10(a): 41 and 42 are a pair of magnetic cores which face each other on opposite sides of a magnetic gap (a gap spacer); a side spacer 44 is formed to provide a space between both sides of the magnetic cores 41, 42 and the shield housing 46. Also, a resin frame 45 is formed to provide a space between the magnetic cores 41, 42 and the case 46 and also to fix the aforementioned magnetic cores and the housing.

In this example, the aforementioned side spacer 44 is made of conductive material (non-magnetic conductive material such as phosphorous bronze) having an insulation layer on both surfaces; in the side spacer 44, a slit-like usable life detection unit 50 is formed, which is disconnected when the magnetic head is worn down to a position h which is shorter than the usable depth D, the distance between the contact surface of the magnetic medium and the magnetic gap 43; as in the gap spacer in the previously described Example 1 or the lamination spacer in Example 2, a terminal of the side spacer 44 is connected to a usable life detection circuit (not illustrated), by which a disconnection of the usable life detection unit 50 due to the wearing down is detected to detect the usable lifetime (the wear-out limits) of the head unit. As the configuration or detection method of the usable life detection circuit remains the same as the aforementioned examples, no further description follows.

Figure 9D:
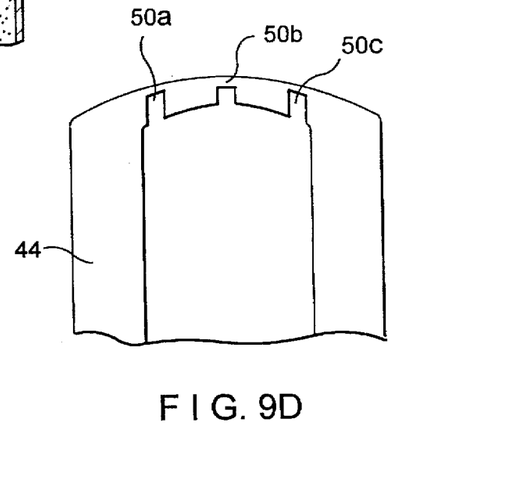

FIG. 9(d) illustrates another configuration example of a side spacer 44, in which slit-like usable life detection units 50a, 50b, 50c are arranged at a plurality of positions such as at the center and both sides of the spacer. Thus, by arranging the side spacer 44, which has the slit-like usable life detection units 50a, 50b, and 50c at a plurality of positions, at both sides of the magnetic cores 41 and 42, the lifetime of the head unit can be surely detected.

The foregoing spacer member may be formed in the gap spacer which forms a magnetic gap or on sides of a magnetic core by means of a film provided by printing or vacuum evaporation, photolithography, sputtering, ion plating, etc.

In the above embodiment, the process where the above spacers are sandwiched to the magnetic gap or on the sides of a magnetic core is eliminated so that this configuration improves the quality of this product. This arrangement maintains stability and accuracy.

In a magnetic head of this invention, a component of a head unit is made of conductive material having an insulation layer on both surfaces; in other words, a spacer for providing a space between a magnetic core and other members, specifically, ether one of a gap spacer which is held between a pair of magnetic cores for forming a magnetic gap, a lamination spacer which is laminated between the magnetic cores in a laminated structure for providing a space, or a side spacer for providing a space between the magnetic core and a shield housing. On the component formed is a usable life detection unit which is disconnected when the head unit is worn down to a position shorter than the usable depth, the distance between the contact surface of a magnetic medium and the magnetic gap, and the disconnection of the usable life detection unit caused by the head's wearing-out is electrically detected. In other words, it is configured so that a usable life detection circuit is connected to the conductive material of the aforementioned component to detect the disconnection (of the current path) due to the wearing down of the aforementioned usable life detection unit, to determine the usable lifetime (wear-out limits) of the head unit; for this reason, the magnetic head can be replaced before reaching its usable lifetime. The inconvenience that the magnetic head reaches its lifetime while being used, is avoided.

A usable life detection unit of a magnetic head of this invention is formed in a spacer member, such as a gap spacer, a lamination spacer, or side spacer, which are normal constituents of a magnetic head. Therefore, it can be easily adopted without any change of the shape or configuration of the magnetic head, and the increase in cost due to applying this invention is minimized.

Furthermore, because it is configured to detect a disconnection of the usable life detection unit due to the head's wearing down via a usable life detection circuit. The problem of a conventional technology is avoided in which a certain precision is affected by property deviations that exist in a resistor. This invention makes detection simple by merely detecting the disconnected status of the usable life detection unit, providing a stable and precise usable life detection method with a simple circuit configuration.

While the foregoing description and drawings represent the preferred embodiments of the present invention, it will be obvious to those skilled in the art that various changes and modifications may be made therein without departing from the true spirit and scope of the present invention.

What is claimed is:

1. A magnetic head having a head unit for contacting a magnetic medium comprising:

at least a pair of magnetic cores being arranged in said head unit which face each other on sides of a magnetic gap for recording and/or reproducing signals;

a spacer for maintaining a space between one of said magnetic cores and another member, said spacer including usable life detection means for providing an indication of wear of said head unit which is interrupted when the head unit is worn down to a predetermined depth; and means for electrically sensing an interruption of said indication so that a usable lifetime of said head unit can be determined.

2. The magnetic head according to claim 1, wherein said other member is the other magnetic core which configures the counterpart of said pair of magnetic cores, and said spacer is a gap spacer which forms said magnetic gap.

3. The magnetic head according to claim 1, wherein at least one magnetic core is configured as a magnetic core of a laminated structure having a plurality of magnetic cores that are laminated, said other member being the other magnetic core which is a counterpart of said magnetic cores of the laminated structure, and said spacer being a lamination spacer which is laminated between said magnetic cores of the laminated structure to provide a space between cores.

4. The magnetic head according to claim 1, having a shield housing to cover the magnetic cores excluding the magnetic gap periphery, wherein said other member is said shield housing, and said spacer is a side spacer which is arranged to provide a space between said magnetic core and said shield housing.

5. A magnetic head having a head unit for contacting a magnetic medium comprising:

at least a pair of magnetic cores being arranged in said head unit which face each other on sides of a magnetic gap for recording and/or reproducing signals;

a gap spacer for maintaining a space between said pair of magnetic cores; said gap spacer being made of conductive material having an insulation layer on outer surfaces thereof; said spacer including usable life detection means for providing an indication of wear of said head unit which is interrupted when the head unit is worn down to a predetermined depth; and means for sensing an interruption of said indication so that a usable lifetime of said head unit can be determined.

6. The magnetic head according to claim 5, wherein said usable life detection means is arranged at a plurality of positions in said gap spacer.

7. The magnetic head according to claim 6, wherein a plurality of said usable life detection means are provided which are arranged at the center and both ends of said gap spacer with respect to the gap width direction.

8. The magnetic head according to claim 6, wherein a plurality of said pair of magnetic cores are arranged corresponding to a plurality of tracks of a magnetic medium, and said usable life detection means are formed at both ends of said magnetic cores on sides of said plurality of magnetic cores.

9. The magnetic head according to claim 5, wherein said sensing means has an alarm which provides a warning when said interruption of said usable life detection means occurs due to wearing down of said head unit.

10. A magnetic head having a head unit for contacting a magnetic medium comprising:

at least a pair of magnetic cores being arranged in said head unit which face each other on sides of a magnetic gap for recording and/or reproducing signals;

at least one of said magnetic cores being a magnetic core of a laminated structure in which a plurality of magnetic cores are laminated;

at least one lamination spacer which is laminated between said magnetic cores of said laminated structure so as to form a space, said spacer being formed of conductive material having an insulation layer on outer surfaces thereof;

usable life detection means being formed in said lamination spacer for providing an indication of wear of said head unit which is interrupted when said head unit is worn down to a predetermined depth; and electrical means for sensing an interruption of said indication so that a usable lifetime of said usable life head unit can be determined.

11. The magnetic head according to claim 10, wherein a plurality of said usable life detection means are arranged at a plurality of positions in said lamination spacer.

12. The magnetic head according to claim 10, wherein a plurality of said usable life detection means are arranged at a plurality of positions in a plurality of lamination spacers.

13. The magnetic head according to claim 10, wherein said one magnetic core having lamination structure is comprised of a reproduction core with narrow width and side cores which are laminated on both sides of said reproduction core by sandwiching a plurality of lamination spacers therebetween, while the other magnetic core is a recording core having the same width as the sum of the reproduction core and side core widths, and said usable life detection means is formed in at least one of said plurality of lamination spacers.

14. The magnetic head according to claim 13, wherein said lamination spacers having said usable life detection means are configured so that an area where conductive material is exposed is used for a terminal, and said electrical sensing means is connected thereto.

15. The magnetic head according to claim 13, wherein said lamination spacers having a usable life detection means are shaped to fit said reproduction core and are laminated on both ends of said reproduction core, and said reproduction core and said lamination spacers on both ends of the reproduction core are wound integrally with wire.

16. The magnetic head according to claim 10, wherein said magnetic core is made of metallic magnetic material; said lamination spacer having said usable life detection means has areas where the conductive material is exposed at both ends of said electrical sensing means; one of said exposed areas being a terminal which is connected to said electrical sensing means while the other said exposed area contacts a magnetic core made of said metallic magnetic material, to complete a circuit of said electrical sensing means via said magnetic core.

17. The magnetic head according to claim 10, wherein said lamination spacer having said usable life detection means is constructed with a flexible circuit board, which is made of flexible insulation material and sandwiches a circuit pattern comprised of an interconnect and connected patterns which are connected to both ends of said interconnection.

18. A magnetic head having a head unit for contacting a magnetic medium comprising:

at least a pair of magnetic cores which face each other on sides of a magnetic gap for recording and/or reproducing signals;

a shield housing to cover said magnetic cores except a magnetic gap periphery;

a side spacer arranged between said magnetic cores and said shield housing to provide a space, said side spacer being made of conductive material having an insulation layer on both surfaces;

usable life detection means being formed in said side spacer for providing an indication of wear when said head unit is worn down to a predetermined depth; and said side space being connected to means for sensing an interruption of said indication so that a usable lifetime of said head unit can be determined.

19. The magnetic head according to claim 18, wherein said usable life detection means is arranged at a plurality of positions in said side spacer.

20. The magnetic head according to claim 18, wherein said side spacer having said usable life detection means is composed of a flexible circuit board made of flexible insulation material, which sandwiches a circuit pattern comprised of a interconnect and connected patterns which are connected to both ends of said interconnect.

* * * * *